US011480488B2

(12) United States Patent
Roberts et al.

(10) Patent No.: US 11,480,488 B2
(45) Date of Patent: Oct. 25, 2022

(54) INDUSTRIAL PROCESS TRANSMITTER WITH RADIATION SHIELD

(71) Applicant: Rosemount Inc., Shakopee, MN (US)

(72) Inventors: David Roberts, Shakopee, MN (US); Matthew Etheridge, Chanhassen, MN (US); Trevor Stroth, Minneapolis, MN (US); Brian Kocher, Chaska, MN (US); Jeffery D. Chivers, Lakeville, MN (US)

(73) Assignee: ROSEMOUNT INC., Shakopee, MN (US)

( * ) Notice: Subject to any disclaimer, the term of this patent is extended or adjusted under 35 U.S.C. 154(b) by 120 days.

(21) Appl. No.: 16/145,300

(22) Filed: Sep. 28, 2018

(65) Prior Publication Data
US 2020/0105429 A1 Apr. 2, 2020

(51) Int. Cl.
G01L 19/14 (2006.01)
G21F 1/08 (2006.01)
G01L 19/06 (2006.01)

(52) U.S. Cl.
CPC ............ G01L 19/14 (2013.01); G01L 19/069 (2013.01); G21F 1/085 (2013.01)

(58) Field of Classification Search
CPC ....... G01F 15/14; G01L 19/069; G01L 19/14; G01L 119/069; G01D 11/245; Y10T 29/49815; G21F 1/085
USPC ......... 250/505.1, 506.1, 507.1, 515.1, 516.1, 250/517.1, 518.1, 519.1
See application file for complete search history.

(56) References Cited

U.S. PATENT DOCUMENTS 3,940,311 A * 2/1976 Frisch ...................... G21C 7/12
376/224
5,524,492 A * 6/1996 Frick ................... G01L 19/0038
73/706
6,484,585 B1 11/2002 Sittler et al.
(Continued)

FOREIGN PATENT DOCUMENTS

CN 101424545 5/2009
CN 202120625 1/2012
(Continued)

OTHER PUBLICATIONS

Notification of Transmittal of the International Search Report and the Written Opinion of the International Searching Authority from International Application No. PCT/US2019/050594, dated Nov. 27, 2019.
(Continued)

Primary Examiner — Nicole M Ippolito
(74) Attorney, Agent, or Firm — Westman, Champlin & Koehler, P.A.

(57) ABSTRACT

An industrial process transmitter includes a housing, sensor circuitry, transmitter circuitry, and a radiation shield. The sensor circuitry is contained in the housing, and is configured to sense a process parameter and generate a sensor output that is indicative of the sensed process parameter. The transmitter circuitry is contained in the housing, and is configured to communicate the sensed process parameter to an external unit. The radiation shield substantially surrounds a portion of the housing containing the sensor circuitry and shields the sensor circuitry from gamma radiation.

19 Claims, 13 Drawing Sheets

(56) References Cited

U.S. PATENT DOCUMENTS

| | | | |
|---|---|---|---|
| 6,508,131 B2* | 1/2003 | Frick | G01D 11/245 |
| | | | 73/756 |
| 6,605,818 B1 | 8/2003 | Cornog et al. | |
| 6,609,427 B1* | 8/2003 | Westfield | G01D 1/00 |
| | | | 73/700 |
| 7,458,275 B2* | 12/2008 | Kleven | G01L 19/003 |
| | | | 73/745 |
| 8,100,018 B2* | 1/2012 | Kurtz | G01L 19/0069 |
| | | | 73/706 |
| 8,234,927 B2 | 8/2012 | Schulte et al. | |
| 9,234,776 B2 | 1/2016 | Strei | |
| 9,281,088 B2* | 3/2016 | Chivers | G01L 19/0645 |
| 9,525,832 B1 | 12/2016 | De La Cruz | |
| 9,752,946 B2 | 9/2017 | Hoffman et al. | |
| 9,891,111 B2 | 2/2018 | Kitzman et al. | |
| 2002/0011115 A1 | 1/2002 | Frick et al. | |
| 2005/0029460 A1 | 2/2005 | Iwatschenko-Borho et al. | |
| 2005/0072242 A1* | 4/2005 | Fandrey | G01L 19/0672 |
| | | | 73/706 |
| 2008/0191133 A1* | 8/2008 | Morris | G01N 23/207 |
| | | | 250/307 |
| 2008/0212266 A1 | 9/2008 | White | |
| 2008/0245158 A1* | 10/2008 | Hedtke | G01L 19/0007 |
| | | | 73/861.63 |
| 2011/0175601 A1 | 7/2011 | Bogos et al. | |
| 2011/0299647 A1 | 12/2011 | Chivers et al. | |
| 2013/0272469 A1* | 10/2013 | Loewen | G21C 17/10 |
| | | | 376/249 |
| 2015/0020600 A1 | 1/2015 | Eriksen et al. | |
| 2016/0084725 A1 | 3/2016 | Hoffman et al. | |
| 2016/0373674 A1 | 12/2016 | De La Cruz | |
| 2017/0003173 A1 | 1/2017 | Kitzman et al. | |
| 2018/0164175 A1* | 6/2018 | Matsuda | G01L 19/142 |
| 2020/0105429 A1 | 4/2020 | Roberts et al. | |
| 2020/0182724 A1* | 6/2020 | Takimoto | G01L 19/069 |

FOREIGN PATENT DOCUMENTS

| | | |
|---|---|---|
| CN | 204044964 | 12/2014 |
| CN | 105719716 | 6/2016 |
| CN | 205283692 | 6/2016 |
| CN | 105806548 | 7/2016 |
| CN | 106323492 A | 1/2017 |
| CN | 206019692 | 3/2017 |
| CN | 209372095 | 9/2019 |
| WO | WO 2010/114469 | 10/2010 |

OTHER PUBLICATIONS

Communication from European Patent Application No. 19773319.9, dated Mar. 4, 2021.
Office Action from Chinese Patent Application No. 201811521772.4, dated May 7, 2021.
Examination Report from Indian Patent Application No. 202127005704, dated Nov. 14, 2022.
Second Office Action from Chinese Patent Application No. 201811521772.4, dated Dec. 9, 2021.
Office Action from Chinese Patent Application No. 201811521772.4, dated May 18, 2022.
Office Action from Chinese Patent Application No. 2018115217724, dated Aug. 8, 2022.

* cited by examiner

INDUSTRIAL PROCESS TRANSMITTER WITH RADIATION SHIELD

BACKGROUND

Embodiments of the present disclosure relate to radiation shields for industrial process transmitters.

In industrial settings, control systems are used to monitor and control inventories of industrial and chemical processes, and the like. Typically, the control system performs these functions using industrial process transmitters distributed at key locations in the industrial process. These transmitters include process measurement transmitters that are configured to sense a parameter of a process using one or more sensors, such as pressure, temperature, level, flowrate, and other process parameters.

Industrial process transmitters may be required to withstand harsh environmental conditions. Nuclear facilities may utilize industrial process transmitters in areas having low-level background radiation. Without proper protection, exposure of the sensor and its circuitry to such radiation can lead to process parameter measurement errors and premature failure of the transmitter.

SUMMARY

Embodiments of the present disclosure are directed to a radiation shield for an industrial process transmitter and, more specifically, to industrial process transmitters that include the radiation shield. One embodiment of the industrial process transmitter includes a housing, sensor circuitry, transmitter circuitry, and a radiation shield. The sensor circuitry is contained in the housing, and is configured to sense a process parameter and generate a sensor output that is indicative of the sensed process parameter. The transmitter circuitry is contained in the housing, and is configured to communicate the sensed process parameter to an external unit. The radiation shield substantially surrounds a portion of the housing containing the sensor circuitry and shields the sensor circuitry from gamma radiation. In some embodiments, the transmitter is a pressure transmitter and the sensor circuitry includes a pressure sensor that is configured to sense a pressure of a process.

Another embodiment is directed to a pressure transmitter that includes a housing, sensor circuitry, transmitter circuitry and a radiation shield. The housing includes a sensor housing and a transmitter housing attached to the sensor housing. In one embodiment, a first end of the sensor housing includes a threaded neck that is received in a threaded socket of the transmitter housing. The sensor circuitry includes a pressure sensor that is configured to sense a pressure of a process. The transmitter circuitry is contained in the transmitter housing and configured to communicate the sensed pressure to an external unit. The radiation shield substantially surrounds the sensor housing and shields the sensor circuitry from gamma radiation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
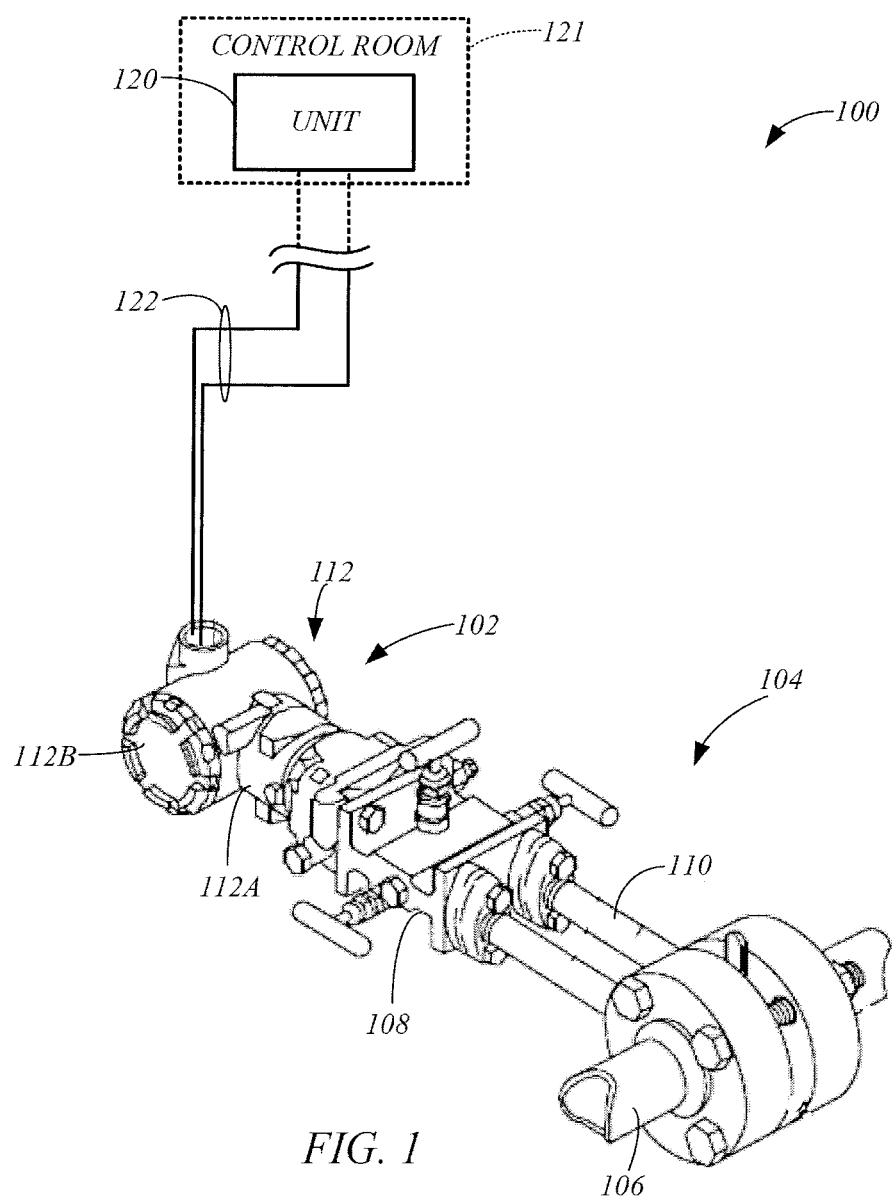
FIG. 1 is a simplified diagram of exemplary industrial process measurement system in accordance with the prior art.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 is a simplified diagram of exemplary industrial process measurement system 100, in accordance with the prior art. The system 100 is used in the processing of a material to transform the material from a less valuable state into more valuable and useful products, such as petroleum, chemicals, paper, food, etc. For example, an oil refinery performs industrial processes that can process crude oil into gasoline, fuel oil, and other petrochemicals.

The system 100 may include an industrial process transmitter 102 and a process interface 104 that couples the transmitter 102 to a process material contained in a process vessel 106. The process vessel 106 may be a pipe (FIG. 1), a tank, or another process vessel. The interface 104 may include a manifold 108 for controlling fluid pathways between the transmitter 102 and the process vessel 106, a process connection 110 that directly couples to the process vessel 106, and/or other conventional process interface components.

Figure 2:
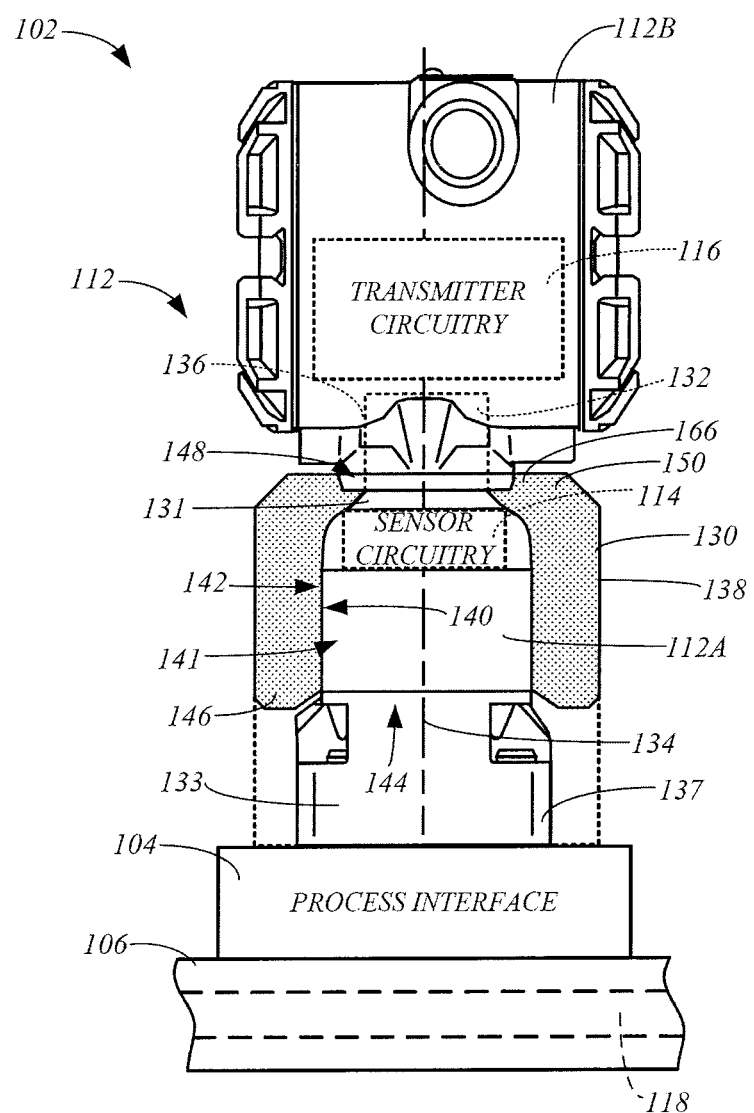
FIGS. 2 and 3 respectively are simplified side and exploded views of an exemplary industrial process transmitter in accordance with embodiments of the present disclosure.
Figure 3:
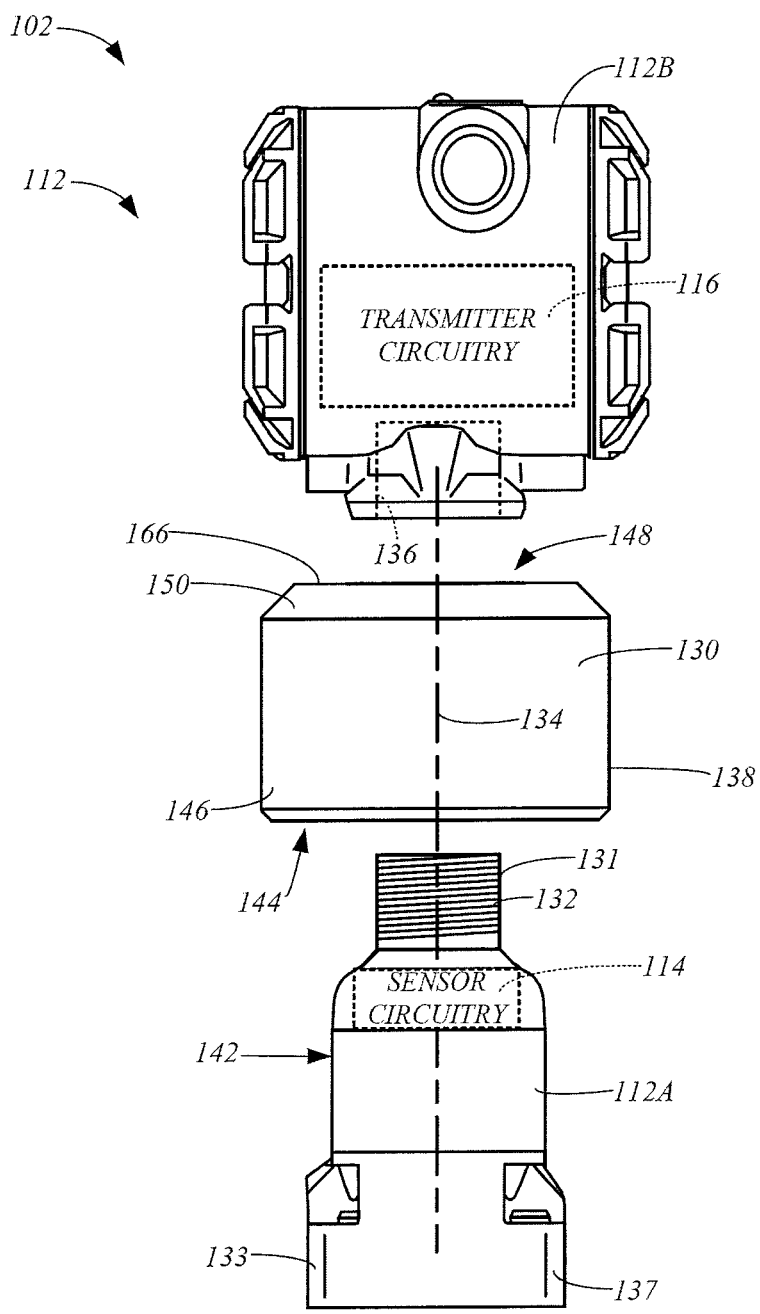

The transmitter 102 includes a housing 112 containing sensor circuitry 114 and transmitter circuitry 116, as shown in FIGS. 2 and 3, which respectively are simplified side and exploded views of an exemplary industrial process transmitter 102 in accordance with embodiments of the present disclosure. The sensor circuitry 114 is configured to measure a parameter of the process material 118 contained in the vessel 106 using a suitable process parameter sensor. Exemplary process parameter sensors include an absolute pressure sensor for measuring an absolute pressure of the process material 118, a differential pressure sensor for measuring a differential pressure within the process material 118, a temperature sensor for measuring a temperature of the process material 118, a level sensor for measuring a level of the process material 118 (e.g., such as within a tank), a flowrate sensor for measuring a flowrate of the process material 118, and other sensors that may be suitable for measuring a parameter of an industrial process.

The transmitter circuitry 116 may be configured to power the sensor circuitry 114, communicate the process parameter that is sensed or measured by the sensor circuitry 114 to an external control or monitoring unit 120 (FIG. 1), and perform other conventional transmitter functions. The unit 120 may be located remotely in a control room 121. The transmitter circuitry 116 may facilitate data communications with the unit 120 over a suitable physical communication link, such as a two-wire control loop 122 (FIG. 1), or a wireless communication link.

Communications between the unit 120 and the transmitter 102 may be performed over the control loop 122 in accordance with conventional analog and/or digital communication protocols. In some embodiments, the control loop 122 includes a 4-20 milliamp control loop, over which the process parameter information may be represented by a level of a loop current I flowing through the control loop 122, in accordance with a conventional analog communication protocol. The transmitter 102 may also be powered by the current I. Exemplary digital communication protocols include the modulation of digital signals onto the analog current level of the two-wire control loop 122, such as in accordance with the HART® communication standard. Other purely digital techniques may also be employed including FieldBus and Profibus communication protocols.

The transmitter circuitry 116 may also be configured to communicate wirelessly with the unit 120 using a conventional wireless communication protocol. For example, the transmitter 102 may be configured to implement a wireless mesh network protocol, such as WirelessHART® (IEC 62591) or ISA 100.11a (IEC 62734), or another wireless communication protocol, such as WiFi, LoRa, Sigfox, BLE.

The sensor circuitry 114 may include electronics that are susceptible to gamma radiation exposure. In general, the sensor circuitry 114 may degrade over time from gamma radiation exposure leading to inaccurate process parameter measurements. For example, process parameter measurements performed by the sensor circuitry 114 may drift over time due to sensor circuitry 114 exposure to gamma radiation.

Embodiments of the present disclosure are directed to a radiation shield 130, which substantially surrounds a portion of the housing 112 and is configured to shield the sensor circuitry 114 from gamma radiation. FIGS. 4-9 are isometric and cross-sectional views of exemplary industrial process transmitters 102 in combination with exemplary radiation shields 130, in accordance with embodiments of the present disclosure.

In some embodiments, the radiation shield 130 includes one or more radiation shielding materials for blocking gamma radiation, such as Bismuth and/or Tungsten. The radiation shielding materials may take the form of polymers filled with Bismuth and/or Tungsten. Thus, the radiation shield 130 operates to extend the reliable life of the sensor circuitry 114 and the transmitter 102 in environments where the transmitter 102 would be exposed to gamma radiation.

In some embodiments, the housing 112 includes a sensor housing 112A containing the sensor circuitry 114, and a transmitter housing 112B containing the transmitter circuitry 116. The sensor and transmitter housings 112A and 112B are coupled together using any suitable technique. In one embodiment, the sensor housing 112A includes opposing ends 131 and 133 that are displaced from each other along the central axis 134 of the transmitter 102. The end 133 may include a base 137 for mounting to a component of the process interface 106, for example. The end 131 may include a neck 132 that extends along the central axis 134 and is received within a socket 136 (FIG. 3) of the transmitter housing 112B. The neck 132 and the socket 136 may each be threaded to allow the housings 112A and 112B to be screwed together. Wiring for power and data communication (not shown) may extend between the sensor circuitry 114 and the transmitter circuitry 116 through the neck 132.

In some embodiments, the radiation shield 130 is focused on providing shielding of the sensor housing 112A and the enclosed circuitry 114, and does not extend substantially over the transmitter housing 112B. This reduces the size and weight of the radiation shield 130 and reduces its cost. In some embodiments, the radiation shield 130 may extend over a portion of the transmitter housing 112B adjacent the sensor housing 112A, as shown in FIG. 2, such as a portion of the transmitter housing 112B containing the socket 136.

The housing 112 is typically formed of steel and provides some attenuation of gamma radiation. Thus, the housing 112 provides a relatively high degree of shielding from gamma radiation along the central axis 134 due to the thickness of the housing 112 and the process interface 104. Accordingly, the transmitter 102 is most vulnerable to gamma radiation traveling along an axis that is oblique or perpendicular to the central axis 134.

In some embodiments, the radiation shield 130 includes one or more sidewalls 138 that extend along the central axis 134 and are configured to shield the sensor circuitry 114 from gamma radiation traveling in a direction that is oblique or perpendicular to the central axis 134. The number of sidewalls 138 depends on the cross-sectional shape of the shield 130 taken in a plane that is perpendicular to the central axis 134. For example, when the cross-sectional shape is cylindrical, the shield may include a single cylindrical sidewall 138, as shown in FIGS. 4-9. However, the cross-sectional shape of the radiation shield 130 may take on other forms, such as polygonal, resulting in multiple sidewalls 138.

Figure 10:
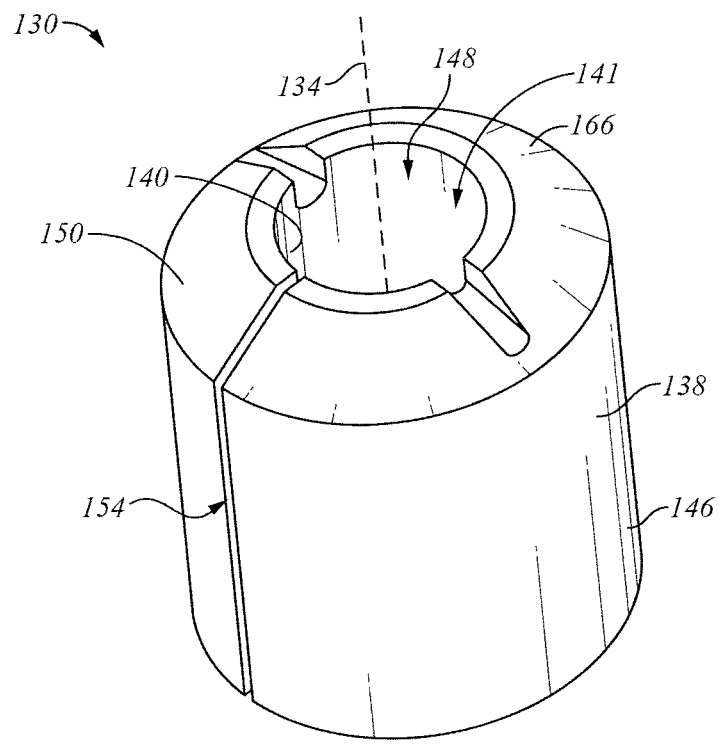
FIGS. 10 and 11 respectively are top and bottom isometric views of an exemplary radiation shield in accordance with embodiments of the present disclosure.
Figure 11:
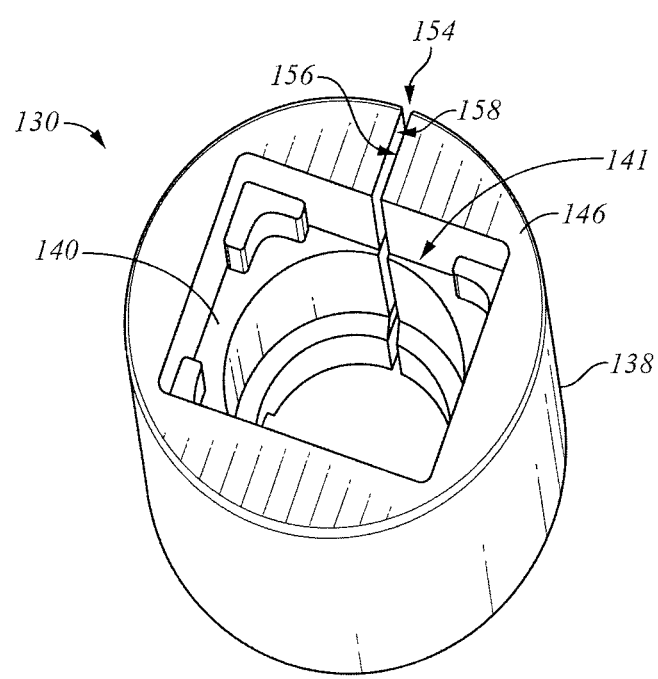

In some embodiments, an interior surface 140 of an interior cavity 141 of the radiation shield 130 substantially conforms to an exterior surface of the sensor housing, as generally shown in FIGS. 3-9. FIGS. 10 and 11 are top and bottom isometric views of the exemplary radiation shield of FIGS. 8 and 9. As shown in FIG. 11, the interior surface 140 of the radiation shield 130 may be shaped to follow the contours of the exterior surface 142 of the sensor housing 112A of FIGS. 8 and 9, which reduces gaps between the radiation shield 130 and the sensor housing 112A. The conforming shape of the interior surface 140 of the radiation shield 130 results in a reduction of relative movement between the shield 130 and the sensor housing 112A during vibration of the transmitter 102, which can result in a reduction of noise and damage to the shield 130 and sensor housing 112A.

The conforming shape of the radiation shield 130 also simplifies installation of the radiation shield 130 on the transmitter 102. For example, the weight of the radiation shield 130 may be used to secure the radiation shield to the sensor housing 112A without the need for additional fasteners.

The radiation shield 130 may be installed over the sensor housing 112A when the transmitter housing 112B is disconnected from the sensor. An opening 144 (FIG. 11) to the interior cavity 141 at an end 146 of the radiation shield 130 is placed over the sensor housing 112A. When the interior surface 140 of the cavity 141 conforms to the sensor housing 112A, the angular orientation of the shield 130 about the central axis 134 may need to be adjusted relative to the sensor housing 112A for the interior cavity 141 of the shield 130 to fully receive the sensor housing 112A. In some embodiments, the shield 130 includes an opening 148 at an end 150 through which the neck 132 of the sensor housing 112A extends. The transmitter housing 112B may then be attached to the sensor housing 112A by receiving the neck 132 in the socket 136.

Figure 4:
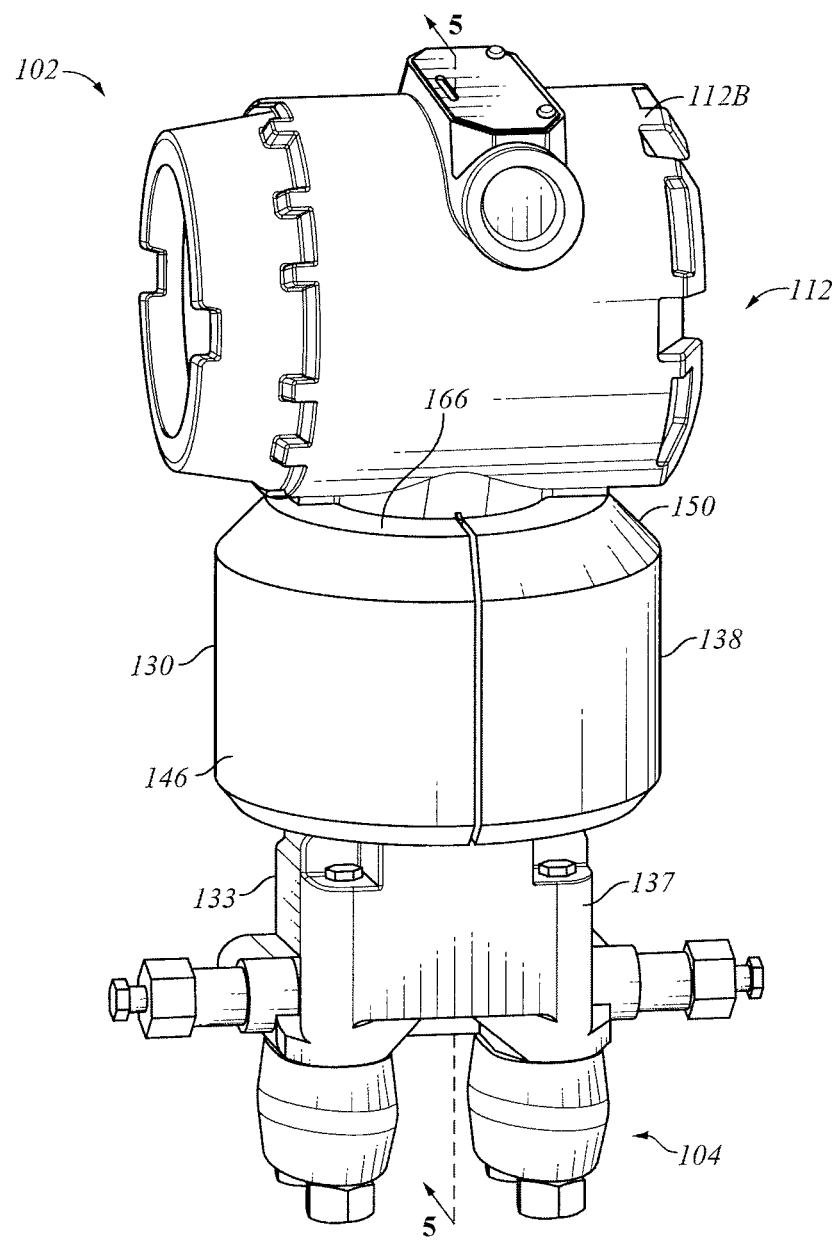
FIG. 4 is an isometric view of an exemplary process transmitter in accordance with embodiments of the present disclosure.
Figure 5:
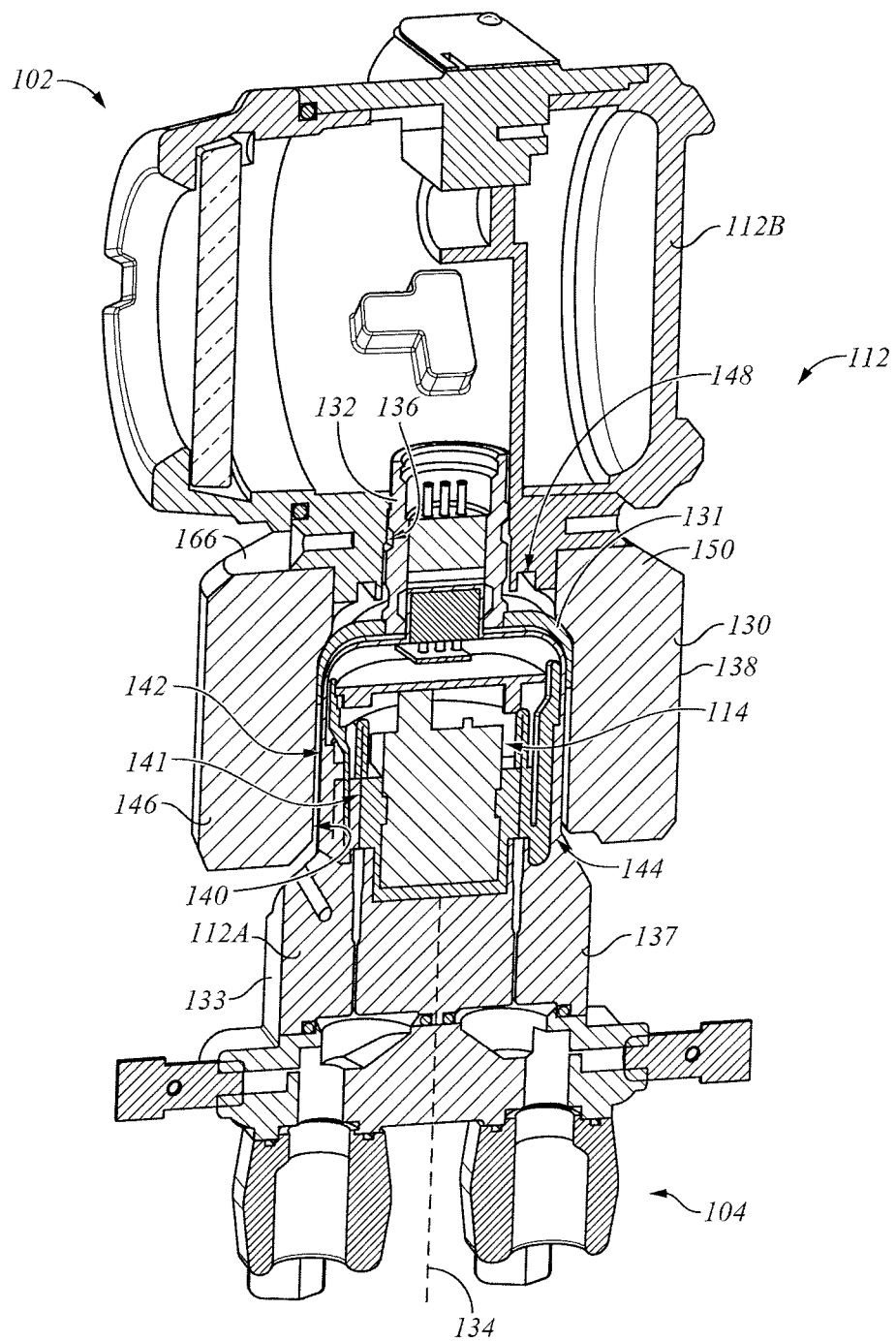
FIG. 5 is a side cross-sectional view of the process transmitter of FIG. 4 taken generally along line 5-5, in accordance with embodiments of the present disclosure.
Figure 6:
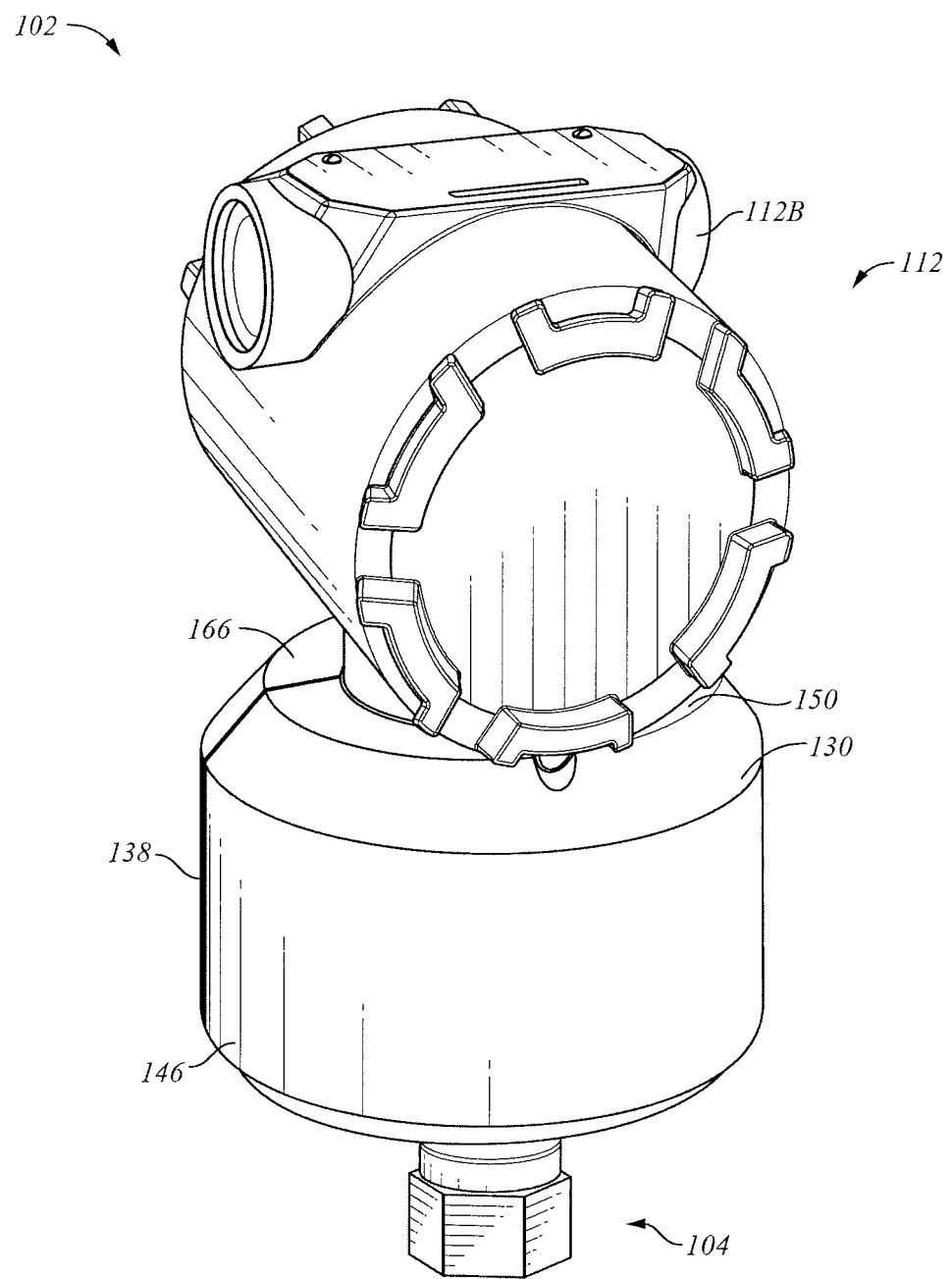
FIGS. 6 and 7 respectively are isometric and partial cross-sectional views of an exemplary process transmitter in accordance with embodiments of the present disclosure.
Figure 7:
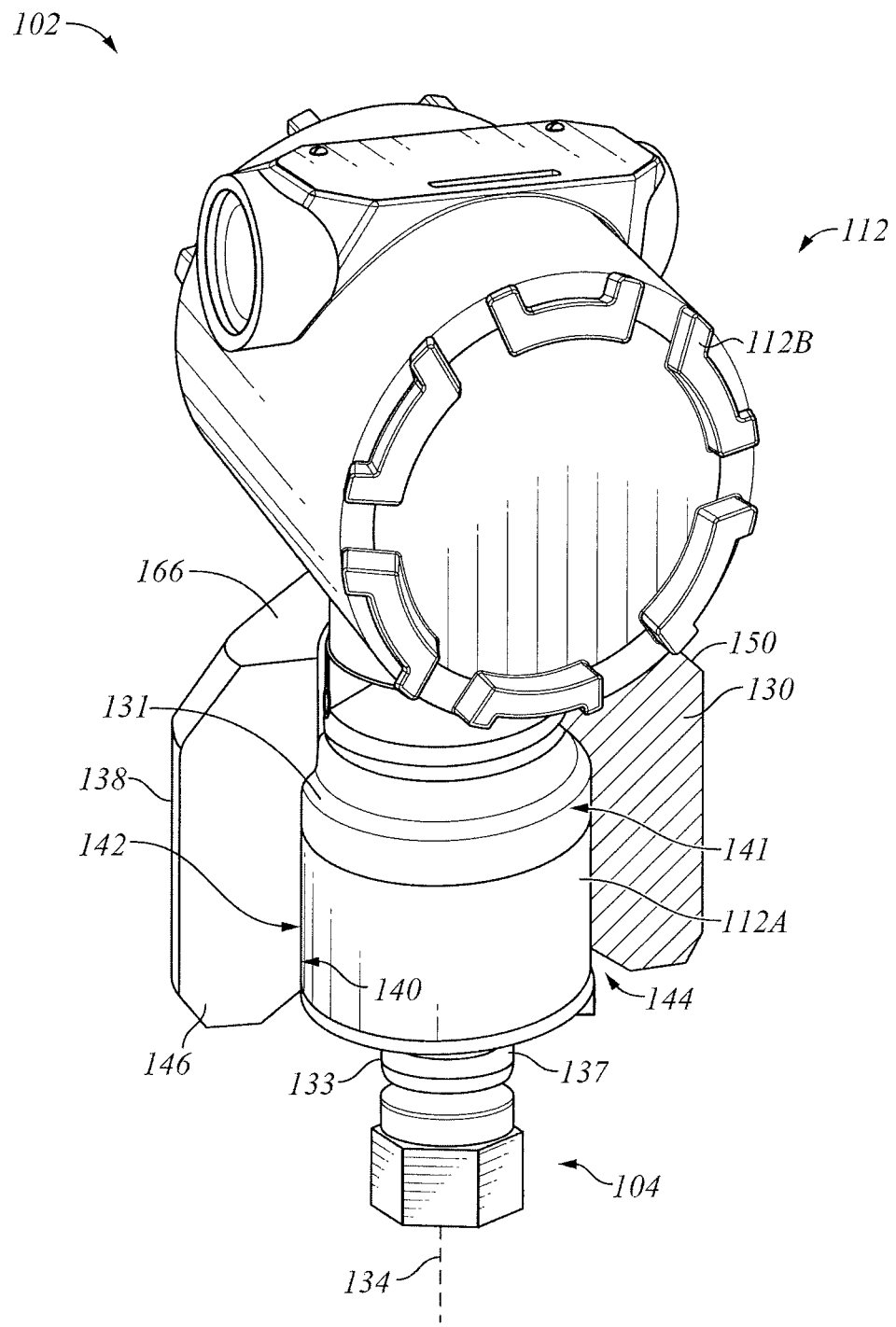
Figure 8:
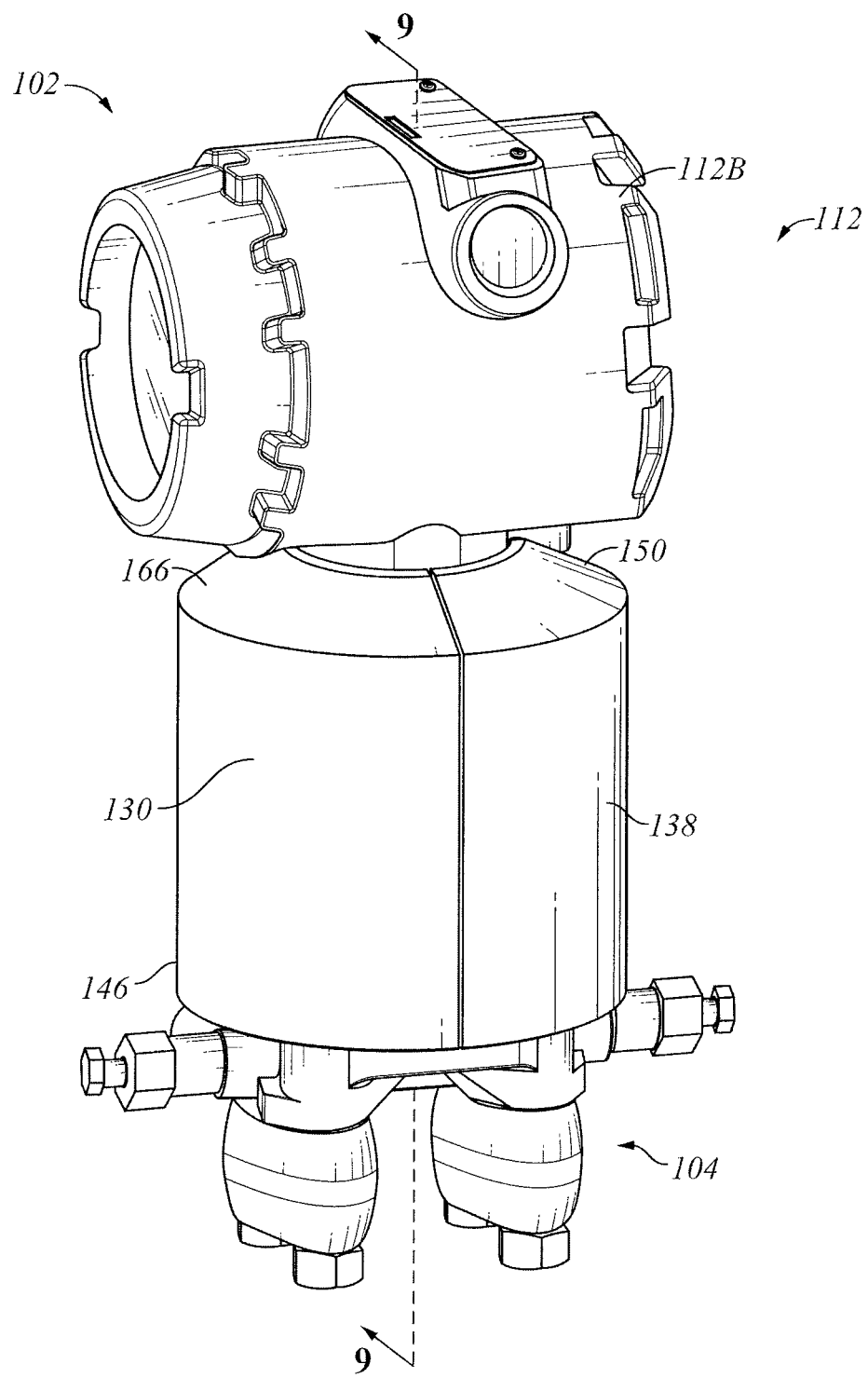
FIG. 8 is an isometric view of an exemplary process transmitter in accordance with embodiments of the present disclosure.
Figure 9:
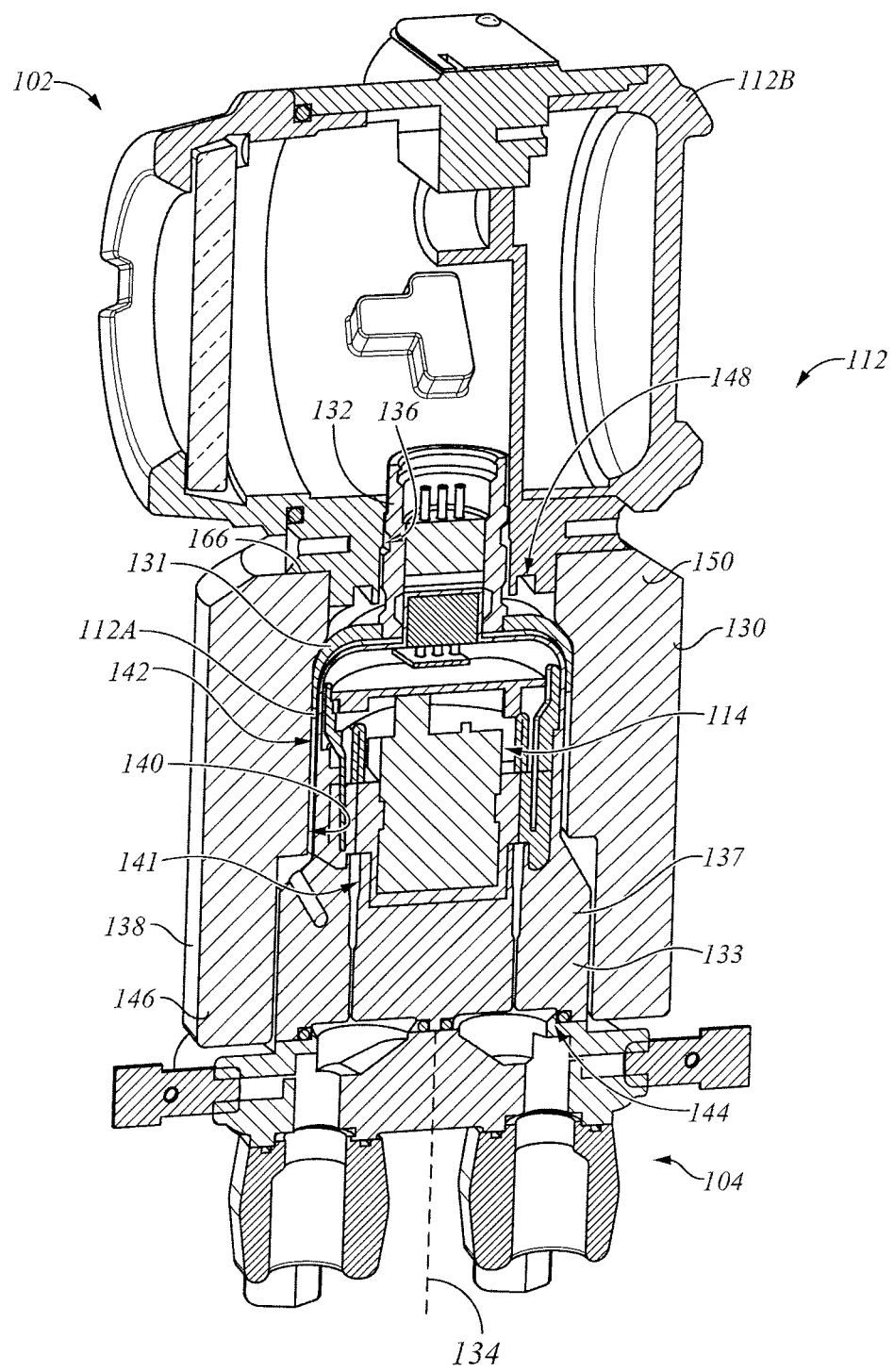
FIG. 9 is a side cross-sectional view of the process transmitter of FIG. 8 taken generally along line 9-9, in accordance with embodiments of the present disclosure.

In some embodiments, the radiation shield 130 covers only an upper portion of the sensor housing 112A, such as from the base of the neck 132 at the end 131 to a location short of the end 133, as shown in FIGS. 2, 4 and 5. Thus, the end 133 of the sensor housing 112A extends through the opening 144 of the radiation shield 130. In other embodiments, the radiation shield 130 extends over the base 137 of the sensor housing 112A, such as indicated in phantom lines in FIG. 2, and shown in FIGS. 8 and 9. Accordingly, the radiation shield 130 may extend along the central axis 134 to the end 133 and surround the base 137.

In some embodiments, the radiation shield 130 includes a slot 154 that generally runs along the central axis 134 and is defined by opposing faces 156 and 158, as shown in FIGS. 10 and 11. In some embodiments, the slot 154 allows the radiation shield 130 to be installed onto a fully assembled transmitter 102 without removing the transmitter housing 112B. For example, the radiation shield 130 may be flexed to expand the slot 154 or gap between the faces 156 and 158 and slip the radiation shield 130 around the sensor housing 112A of the fully assembled transmitter 102. A pipe clamp or other suitable fastener may be used to secure the radiation shield 130 to the transmitter 102. Thus, the slot 154 allows the radiation shield 130 to be installed with minimal effort. The slot 154 may also reduce stresses that may develop in the radiation shield 130 during thermal expansion and contraction of the shield 130. Alternatively, the radiation shield 130 may be formed in two pieces and assembled around the sensor housing 112A.

Additional embodiments of the radiation shield 130 will be described with reference to FIGS. 12 and 13, which respectively are a simplified diagram and an isometric view of an exemplary industrial process transmitter 102 having a radiation shield 130 in accordance with embodiments of the present disclosure. According to this embodiment, the radiation shield 130 attaches to the process interface 104 to which the base 137 of the sensor housing 112A is attached. In one example, the base 137 is coupled to a flange 160 of the process interface 104, and the radiation shield 130 is attached to the flange 160, such as with bolts 162, for example. In some embodiments, the radiation shield 130 is not directly coupled to the housing 112 of the transmitter 102.

Figure 12:
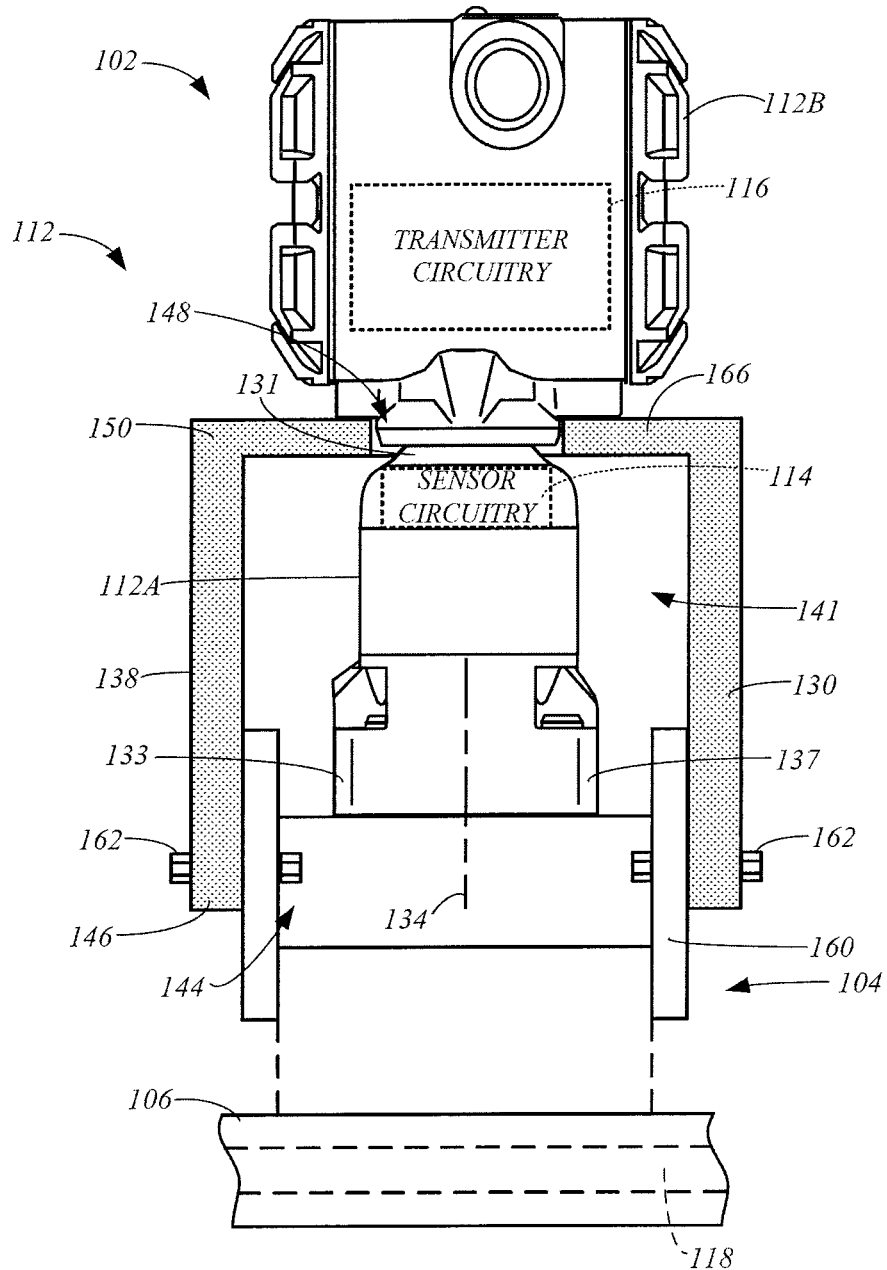
FIG. 12 is a simplified diagram of an exemplary industrial process transmitter in accordance with embodiments of the present disclosure.
Figure 13:
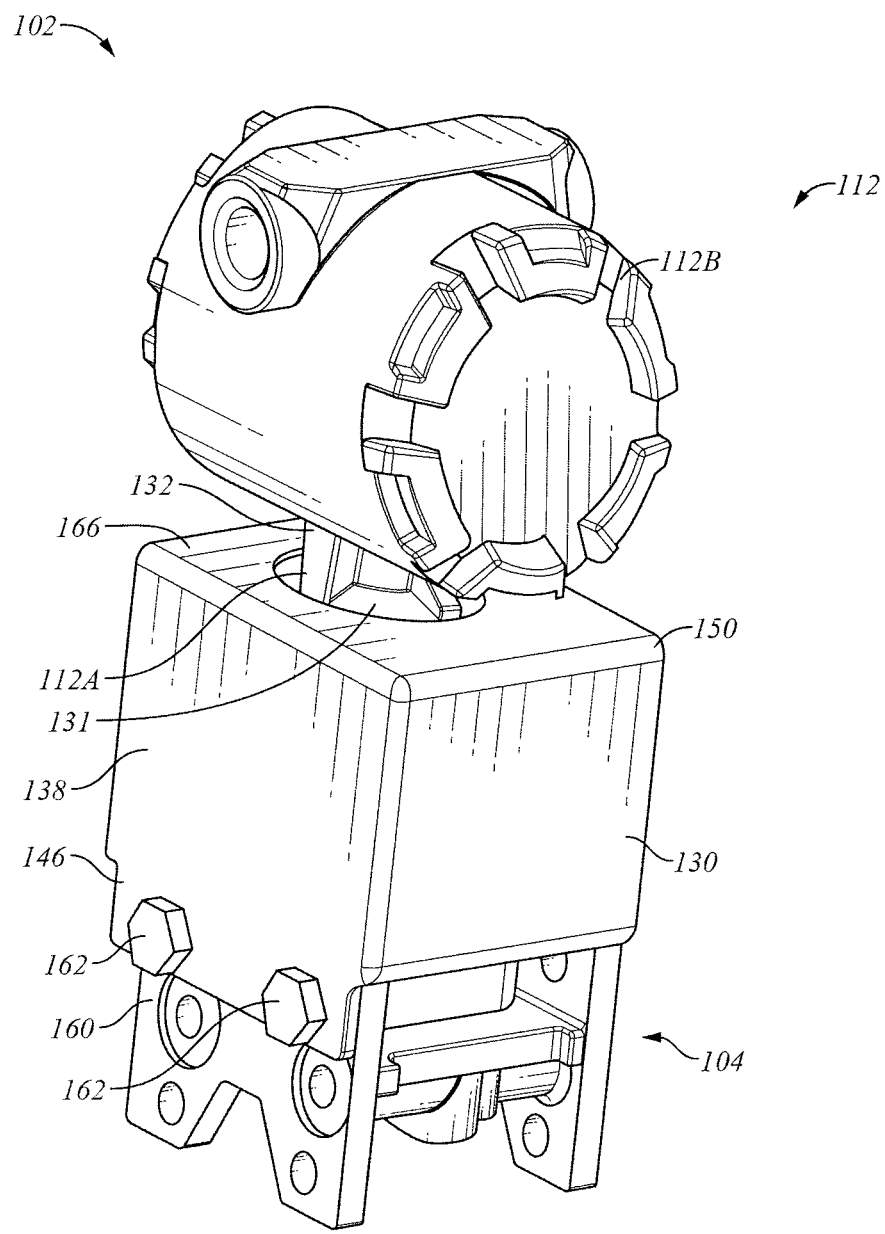
FIG. 13 is an isometric view of an exemplary industrial process transmitter in accordance with embodiments of the present disclosure.

In some embodiments, the interior cavity 141 of the radiation shield 130 does not conform to the sensor housing 112A, as shown in FIG. 12. This allows the shield 130 to be used with a variety of transmitters 102 and sensor housings 112A.

A thickness of the radiation shield 130, particularly the thickness of the one or more sidewalls 138, and the corresponding shielding materials may be selected to provide a desired level of radiation shielding. For example, when the radiation shield 130 is formed of Tungsten and has a 1-inch thickness, the shield 130 may provide up to 62% attenuation of gamma radiation. This shielding could extend the life of the transmitter 102 by two times that of the transmitter 102 without the radiation shield 130. Thicker shielding 130 may yield greater gamma radiation attenuation, but with the tradeoff of increased weight and cost.

Due to the desire to protect the sensor circuitry 114 from gamma radiation traveling obliquely to the central axis 134, the thickness of the one or more sidewalls 138 may be greater than the thickness of walls of the shield that extend perpendicularly to the central axis 134. For example, the radiation shield 130 may include a neck portion 166 that extends generally perpendicular to the central axis 134 and has a thickness that is less than the thickness of the one or more sidewalls 138, as shown in FIGS. 2 and 12. This utilization of thinner walls extending perpendicularly to the central axis 134 reduces the weight and cost of the radiation shield 130 relative to a form of the shield 130 in which all of the walls have the same or similar thicknesses.

Figure 14:
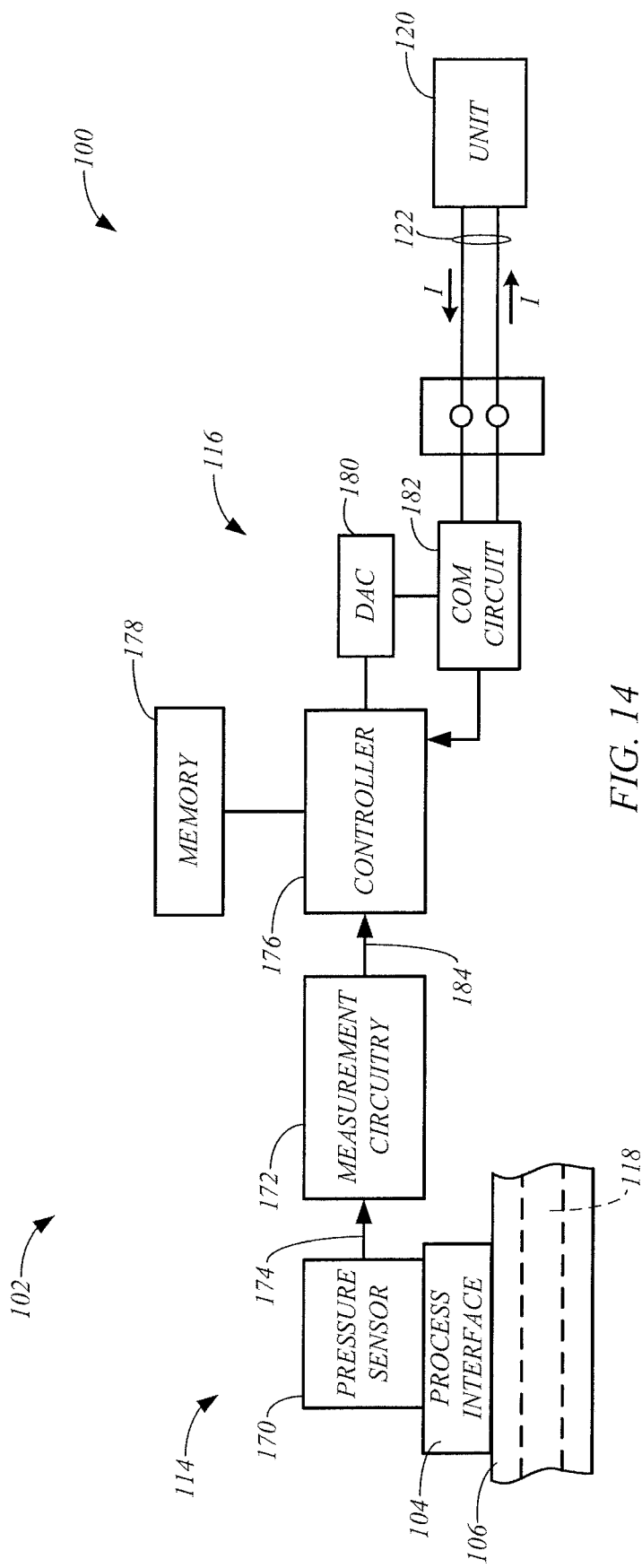
FIG. 14 is a simplified block diagram of circuitry of an industrial process transmitter in accordance with embodiments of the present disclosure.

FIG. 14 is a simplified block diagram of industrial process transmitter circuitry in accordance with embodiments of the present disclosure. As mentioned above, the transmitter includes sensor circuitry 114 for measuring or sensing a parameter (e.g., pressure, temperature, flowrate, etc.) of the process, and transmitter circuitry 116 that may power the sensor circuitry 114 and communicate the process parameter sensed by the sensor circuitry 114 to an external unit 120 (FIG. 1), for example.

The sensor circuitry 114 includes a process parameter sensor 170, such as a pressure sensor (i.e., an absolute pressure sensor or a differential pressure sensor), a temperature sensor, a level sensor, a flowrate sensor, or another sensor for measuring a parameter of the process. The sensor circuitry 114 may also include measurement circuitry 172 that processes a sensor output 174 from the sensor 170 that is indicative of the sensed process parameter. For example, the measurement circuitry 172 may translate the sensor output 174 to a desired form for the transmitter circuitry 116.

The transmitter circuitry 116 may include a controller 176, memory 178, a digital-to-analog converter (DAC) 180 and a communications circuit 182. The controller 176 may represent one or more processors (i.e., microprocessor, central processing unit, etc.) that control components of the transmitter 102 to perform one or more functions described herein in response to the execution of instructions, which may be stored locally in the non-transitory computer readable media or memory 178. In some embodiments, the processors of the controller 176 are components of one or more computer-based systems. The controller 176 may include one or more control circuits, microprocessor-based engine control systems, one or more programmable hardware components, such as a field programmable gate array (FPGA), that are used to control components of the transmitter 102 to perform one or more functions described herein. The controller 176 may also represent other conventional industrial process transmitter circuitry.

The DAC 180 may be used by the controller 176 to convert digital signals 184 from the measurement circuitry 172 into analog signals that are communicated to the unit 120 using the communications circuit 182, such as over the two-wire process control loop 122 by adjusting the loop current I to indicate a value of a process parameter sensed by the sensor 170, for example. The controller 176 may also receive communications from the unit 120 through the communications circuit 182 using conventional techniques.

Although the embodiments of the present disclosure have been described with reference to preferred embodiments, workers skilled in the art will recognize that changes may be made in form and detail without departing from the spirit and scope of the present disclosure.

What is claimed is:

1. An industrial process transmitter comprising:
a housing comprising a sensor housing and a transmitter housing that is displaced from the sensor housing along a central axis;
sensor circuitry contained in the sensor housing including a pressure sensor and configured to sense a process parameter and generate a sensor output that is indicative of the sensed process parameter;
transmitter circuitry contained in the transmitter housing and configured to communicate the sensed process parameter to an external unit;
a radiation shield surrounding an exterior wall of the sensor housing containing the sensor circuitry, the radiation shield configured to be installed on a fully assembled transmitter without removing the housing and shield the sensor circuitry from gamma radiation; and
wherein the radiation shield has an interior wall surface that conforms to an exterior surface of the exterior of the housing.

2. The industrial process transmitter of claim 1, wherein the radiation shield comprises Bismuth or Tungsten.

3. The industrial process transmitter of claim 1, wherein the radiation shield includes at least one sidewall extending along the central axis and surrounding the sensor housing, the radiation shield configured to shield the sensor circuitry from gamma radiation travelling in a direction that is oblique to the central axis.

4. The industrial process transmitter of claim 3, wherein the radiation shield includes a slot extending along the central axis and end faces on opposing sides of the slot.

5. The industrial process transmitter of claim 1, wherein:
a first end of the sensor housing includes a neck extending along the central axis; and
the radiation shield includes a first opening through which the neck extends.

6. The industrial process transmitter of claim 5, wherein:
the neck of the sensor housing includes a threaded exterior surface; and
the transmitter housing includes a threaded socket that receives the threaded exterior surface of the neck.

7. The industrial process transmitter of claim 5, wherein:
the sensor housing includes a second end that is displaced from the first end along the central axis; and
the radiation shield includes a second opening through which the second end extends.

8. The industrial process transmitter of claim 5, wherein:
the sensor housing includes a second end that is displaced from the first end along the central axis; and
the radiation shield extends along the central axis to the second end.

9. The industrial process transmitter of claim 5, wherein:
the industrial process transmitter includes a flange attached to a second end of the sensor housing that is displaced from the first end along the central axis; and
the radiation shield is attached to the flange.

10. The industrial process transmitter of claim 5, wherein the sensor circuitry is configured to sense a process parameter selected from the group consisting of a pressure, a temperature, a flowrate, and a level.

11. The industrial process transmitter of claim 5, wherein the sensor circuitry comprises a pressure sensor.

12. The industrial process transmitter of claim 11, wherein the sensor circuitry comprises measurement circuitry configured to receive an output signal from the pressure sensor and generate a pressure output that is indicative of a pressure sensed by the pressure sensor.

13. The industrial process transmitter of claim 1, wherein the radiation shield includes two pieces that are assembled around the portion of the housing.

14. An industrial process transmitter comprising:
a housing including a sensor housing and a transmitter housing attached to the sensor housing, a first end of the sensor housing including a threaded neck that is received in a threaded socket of the transmitter housing;
sensor circuitry contained in the sensor housing and including a pressure sensor configured to sense a pressure of a process;
transmitter circuitry contained in the transmitter housing and configured to communicate the sensed pressure to an external unit;
a radiation shield surrounding an exterior wall of the sensor housing and configured to be installed on a fully assembly transmitter without removing the housing and shield the sensor circuitry from gamma radiation; and
wherein the radiation shield has an interior surface that substantially conforms to an exterior surface of the sensor housing.

15. The industrial process transmitter of claim 14, wherein:
the sensor housing is displaced from the transmitter housing along a central axis; and
the radiation shield includes at least one sidewall extending along and around the central axis configured to shield the sensor circuitry from gamma radiation travelling in a direction that is oblique to the central axis.

16. The industrial process transmitter of claim 14, wherein the radiation shield comprises Bismuth or Tungsten.

17. The industrial process transmitter of claim 14, wherein:
the sensor housing includes a first end and a second end that is displaced from the first end along the central axis; and
the radiation shield includes a second opening through which the second end extends.

18. The industrial process transmitter of claim 14, wherein:
the sensor housing includes a first end and a second end that is displaced from the first end along the central axis; and
the radiation shield extends along the central axis to the second end.

19. The industrial process transmitter of claim 4 wherein the radiation shield is configured to be clamped thereby securing the radiation shield to the sensor housing.

* * * * *